(12) United States Patent
Bewersdorf et al.

(10) Patent No.: US 7,742,226 B2
(45) Date of Patent: Jun. 22, 2010

(54) INTERFERENCE MICROSCOPE, AND METHOD FOR OPERATING AN INTERFERENCE MICROSCOPE

(75) Inventors: Joerg Bewersdorf, Heidelberg (DE); Hilmar Gugel, Dossenheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 64 days.

(21) Appl. No.: 11/458,914

(22) Filed: Jul. 20, 2006

(65) Prior Publication Data
US 2006/0291043 A1  Dec. 28, 2006

Related U.S. Application Data

(62) Division of application No. 10/037,538, filed on Jan. 4, 2002, now abandoned.

(30) Foreign Application Priority Data

Jan. 5, 2001  (DE)  ............................... 101 00 247

(51) Int. Cl.
G02B 21/06  (2006.01)
G02B 21/00  (2006.01)
(52) U.S. Cl. .................. 359/389; 359/368; 359/385
(58) Field of Classification Search .......... 359/368–390
See application file for complete search history.

(56) References Cited

U.S. PATENT DOCUMENTS

| 4,302,678 A | 11/1981 | Schiffert | 250/461.1 |
|---|---|---|---|
| 4,621,911 A | 11/1986 | Lanni et al. | 359/385 |
| 4,998,284 A | 3/1991 | Bacus et al. | 382/133 |
| 5,671,085 A | 9/1997 | Gustafsson et al. | 359/385 |
| 5,671,985 A | 9/1997 | Grieser et al. | 312/221 |
| 5,760,951 A * | 6/1998 | Dixon et al. | 359/385 |
| 5,776,674 A | 7/1998 | Ulmer | 435/6 |
| 5,801,881 A * | 9/1998 | Lanni et al. | 359/386 |
| 6,055,097 A | 4/2000 | Lanni et al. | 359/386 |
| 6,597,499 B2 | 7/2003 | Kawano et al. | 359/387 |
| 6,690,509 B2 | 2/2004 | Vodyanoy et al. | 359/368 |
| 6,737,167 B2 | 5/2004 | Tsai et al. | 428/432 |
| 2002/0030886 A1* | 3/2002 | Bewersdorf et al. | 359/387 |
| 2002/0097489 A1 | 7/2002 | Kawano et al. | |

FOREIGN PATENT DOCUMENTS

| EP | 0491289 | 6/1992 |
|---|---|---|
| EP | 1 162 450 | 12/2001 |
| GB | 2 273 994 | 7/1994 |
| JP | 08082747 | 3/1996 |
| JP | 08219994 | 8/1996 |
| JP | 11501404 | 2/1999 |
| JP | 2000-221105 | 8/2000 |

* cited by examiner

*Primary Examiner*—Thong Nguyen
(74) *Attorney, Agent, or Firm*—Leydig, Voit & Mayer, Ltd.

(57) ABSTRACT

The present invention concerns an interference microscope and a method for operating an interference microscope, in particular a 4π microscope, standing wave field microscope, or $I^2M$, $I^3M$, or $I^5M$ microscope, at least one specimen support unit associated with the specimen being provided. For determination of the phase position of the interfering light in the specimen region, on the basis of which the interference microscope can be aligned, the interference microscope is characterized in that for determination of the illumination state in the specimen region of the interference microscope, at least one planar area of the specimen support unit is configured to be detectable by light microscopy.

17 Claims, 6 Drawing Sheets

INTERFERENCE MICROSCOPE, AND METHOD FOR OPERATING AN INTERFERENCE MICROSCOPE

CROSS REFERENCE TO RELATED APPLICATIONS

This is a divisional of application Ser. No. 10/037,538, filed Jan. 4, 2002, now abandoned, which claims priority to German patent application 101 00 247.5, filed Jan. 5, 2001, the entire subject matters of both of which are hereby incorporated by reference herein.

FIELD OF THE INVENTION

The present invention concerns an interference microscope and a method for operating an interference microscope. A $4\pi$ microscope, standing wave field microscope, or an $I^2M$ (Image Interference Microscopy), $I^3M$ (Incoherent Interference Illumination Microscopy), or $I^5M$ (Image Interference Microscopy and Incoherent Interference Illumination Microscopy combination) microscope is provided, in particular, as the interference microscope. At least one specimen support unit is associated with the specimen.

BACKGROUND OF THE INVENTION

Interference microscopes are known from practical use. EP 0 491 289 A1, for example, discloses a double-confocal scanning microscope or $4\pi$ microscope in which a specimen is illuminated in point-like fashion by two microscope objectives arranged opposite one another. As a result of this double-sided illumination of the specimen and/or the double-sided detection of the light coming from the specimen, an interference pattern is created with which an increase in axial resolution can be achieved.

U.S. Pat. No. 4,621,911 discloses a standing wave field microscope in which a standing wave field or interference pattern serving to illuminate a specimen is formed by the superposition of two light beams proceeding in collimated fashion. This standing wave field has planes of equal illumination intensity oriented parallel to the focal plane of the microscope objectives, the illumination intensity varying from a maximum illumination intensity value to a minimum illumination intensity value, and the alternating illumination variation being continued periodically along the optical axis of the microscope objectives. With this interferometric illumination method, fluorescent specimens can be excited to fluoresce in accordance with the illumination pattern, thereby also allowing an axial resolution improvement to be achieved.

U.S. Pat. No. 5,671,085 discloses an $I^2M$, $I^3M$, or $I^5M$ microscope in which a specimen is also excited to fluoresce with a bright-field incident illumination through two microscope objectives arranged opposite one another. Here as well, the illuminating light and/or detected light can be caused to interfere, thereby again making it possible to achieve axial resolution improvements.

Very generally, interference microscopes comprise an illuminating beam path of at least one light source, as well as a detected beam path of at least one detector. In the aforementioned interference microscopes, two objectives are arranged on either side of the specimen plane, the objectives being directed toward one another. At least one beam splitter for distributing the illuminating light to the objectives, and a beam combiner for combining the detecting light coming from the objectives, is provided in the illuminating/detected beam paths. The beam splitter and the beam combiner can be configured as one and the same component. Specimens specifically stained with fluorescent markers, in particular biological specimens, are usually examined with the aforementioned interference microscopes. In this context the light of the light source is used to excite the fluorescent markers, and only that fluorescent light is detected by the detector.

Because of their interferometric construction and the small dimensions of the objective focus, interference microscopes of the species are highly susceptible to shock, vibration, and thermal expansion. The equalization of optical path length differences between the interferometer beam path segments is, in particular, a critical influencing variable for successful operation of an interference microscope. The optical path length differences must be so small that, on the one hand, the illuminating light passing through the two interferometer beam path segments can interfere; i.e. the optical path length difference between the two interferometer beam path segments must be smaller than the coherence length of the illuminating light. On the other hand, the two interferometer beam path segments must be equalized with one another in terms of optical path length difference in such a way that constructive interference is present in the specimen region of the interference microscope.

In interference microscopes hitherto implemented, alignment of the interference beam path segments is performed, in practice, on the basis of detections of individual specimen regions. For example, an axial optical section through a point-like or linear specimen is acquired, and alignment of the interference microscope is performed on the basis of its intensity signal profile. From the axial intensity signal profile, conclusions can be drawn regarding the illumination conditions actually present in the specimen region, i.e. as to whether constructive or destructive interference is present. This alignment is complex, and must be performed individually by the operator of the interference microscope. In addition, a great deal of experience on the part of the operator is indispensable for successful alignment, so that ultimately, interference microscopes of the species can be used only by a small group of operators; this has heretofore impeded wide distribution of the interference microscopes discussed above.

SUMMARY OF THE INVENTION

It is therefore an object of the present invention to provide and an interference microscope, and a method for operating such an interference microscope, with which it is possible to determine the phase position of the interfering light in the specimen region, on the basis of which the interference microscope can be aligned.

The interference microscope according to the present invention comprises:
  at least one specimen support unit;
  a specimen being provided and associated with the specimen support unit and,
  at least one planar area is provided for determination of an illumination state in the specimen in the interference microscope wherein the at least one planar area is a surface on the specimen support unit and is configured to be detectable by light microscopy.

What has been recognized according to the present invention is firstly that it is possible to dispense with the detection of individual specimen regions for determination of the phase position if at least one suitably configured planar area of the specimen support unit is used as a reference specimen. Especially in the detection of fluorescent specimens, this reduces stress on the fluorescent specimen to be detected, since the necessary measurements for detecting the phase position of the interfering light can be performed at the planar area of the specimen support unit. Bleaching of the fluorescent specimen merely for purposes of phase determination can thus be avoided, since the measurement for determining the phase position of the interfering light can be performed in a region of the planar area of the specimen support unit that is sufficiently remote from the specimen that the specimen is excited very little or not at all to fluoresce. A reference measurement at a planar area of the specimen support unit using light of a wavelength that is not suitable for exciting the fluorescent markers would also be conceivable, but it also would not furnish a higher-contrast measurement signal of the specimen, since the specimen generally absorbs only weakly.

According to the present invention, therefore, the planar area of the specimen support unit is configured to be detectable by light microscopy. For this purpose, in particular, a planar area of the specimen support unit is configured or prepared in such a way that light can be reflected or induced at said planar area.

The present invention also provides a method for operating an interference microscope including a first and a second objective. The method includes:

providing at least one specimen support unit associated with a specimen, the specimen support unit including a planar area configured to support a specimen in a specimen region of the microscope with the first and second objectives disposed on opposite sides of the specimen;

positioning the specimen support unit so as to dispose the planar area in a focus region of the first objective;

reflecting or inducing light at the planar area;

providing an intensity signal profile as a function of an axial position of the planar area by detecting the reflected or induced light; and determining an illumination state in the specimen region based on the provided intensity signal profile.

BRIEF DESCRIPTION OF THE DRAWINGS

There are various ways of advantageously embodying and developing the teaching of the present invention. The reader is referred, to the specification below of the preferred exemplary embodiments of the invention with reference to the drawings. In the drawings.

DETAILED DESCRIPTION OF THE INVENTION

A planar area of the specimen support unit configured to be detectable by light microscopy could be implemented by way of an at least partially reflective coating of a surface of the specimen support unit, for example in the form of a cover slip coated on one side. As an alternative thereto, the specimen support unit could comprise a reflective or luminescent layer between two glass plates, so that a planar area configured to be detectable by light microscopy is created by said layer. Two glass plates of differing material properties in direct contact with one another could also form a planar area configured to be detectable by light microscopy, for example if the refractive indices of the two glass plates differ, the planar area being detectable by light microscopy by way of the refractive index transition. In addition, the use of crystal or glass plates having holographic coatings or configurations can result in a planar area configured to be detectable by light microscopy. As an alternative thereto, a surface of the specimen support unit could be coated with a fluorescent layer, so that fluorescent light can be induced at said surface. Although a planar area usually has a two-dimensional extension, in this context a "planar area" is certainly also to be understood as a layer or an object having a three-dimensional extension, although also having only a small physical extension in one dimension.

A combination of these possibilities is also conceivable; in that case both a reflective and a fluorescent layer are provided, so that the fluorescent layer is excited to fluoresce by the illuminating light (i.e. fluorescent light is induced), and the illuminating light is reflected from the reflective layer.

This induced and/or reflected light is detected by a detector. Based on the detected signals, conclusions can be drawn as to the phase position directly in the specimen region of the interference microscope, as a result of which the interference microscope can be correspondingly aligned. In advantageous fashion, this procedure for determining the illumination state in the specimen region of the interference microscope makes possible a reproducible and at the same time objective measurement, since the result of said measurement depends only on the surface prepared in defined fashion or on the defined properties of the planar area, and the measurement does not need to be performed on the specimen to be measured. This procedure moreover necessarily results in a reproducible result, which is not always possible with the procedure known from the existing art in which the illumination state in the specimen region is detected at the specimen itself) since, for example, the specimen may not comprise suitable structures on the basis of which conclusions can be drawn as to the actually existing phase position of the illuminating light.

At least one planar area of the specimen support unit could be of partially reflective configuration. For that purpose, the surface could be coated. In particular, the surface could be coated in such a way that it possesses a defined degree of reflection that preferably is constant over the entire surface. The coating of the surface could be wavelength-dependent so that, for example, only light of a specific wavelength is reflected at the surface coating. A metallic or dielectric coating is provided as the surface coating; a dielectric or metallic/dielectric hybrid coating would also be conceivable.

In further advantageous fashion, at least one surface of the specimen support unit comprises at least one layer that can be excited to luminesce, in particular to fluoresce. This luminescent layer could be a monolayer. Monolayers possess a defined thickness that is determined by the dimension of the luminescent molecules used and by their arrangement on the surface. A monolayer thus represents an ideal planar structure suitable for luminescence.

In advantageous fashion, the surface of the specimen support unit is equipped with several luminescent layers, each of which has different luminescent properties. These luminescent layers can be selectively excited to luminesce by light of different wavelengths, and the luminescent light emitted by the luminescent layers (which also differs in wavelength) can be selectively detected. In a preferred embodiment, several monolayers of differing luminescent properties that can be excited to luminesce are provided as the surface coating. The luminescent layer or layers can be excited to luminesce with light of a light source. This could be the light source of the interference microscope; the use of an additional light source that only excites the luminescence of the luminescent layer is also conceivable. Ideally, the light source emits light of different wavelengths, so that a surface coated with several different luminescent layers can be excited to luminesce with light of that one light source. Concretely, this could be an argon-krypton laser that simultaneously emits light of the wavelengths 488 nm, 568 nm, and 647 nm. The use of an HBO lamp is also possible; with this light of different wavelengths it is also possible to excite different luminescent wavelengths to luminesce.

In an alternative embodiment, provision is made for inducing light by means of non-linear processes at a planar area of the specimen support unit. In particular, coherent anti-Stokes Raman scattering (CARS) is provided as the non-linear process. CARS is a four-wave mixed process that is proportional to the square of the intensity of the light used. CARS occurs only at locations at which an optical asymmetry exists, for example a discontinuity in refractive index that is present at the surface of the specimen support unit because a refractive index transition exists there from glass to the immersion medium surrounding the specimen.

In a preferred embodiment, the light reflected and/or induced at the planar area is detected using the detector of the interference microscope. This is advantageous in particular when the light reflected/induced at the planar area lies approximately in the same power level range and wavelength range as the light of the specimen to be detected, and is adapted to the detection range of the detector of the interference microscope. It is also conceivable, however, for the light reflected/induced at the planar area to be detectable with an additional detector. For that purpose, the reflected/induced light is, by means of at least one optical component, switched out of the detected or illuminating beam path of the interference microscope and conveyed to the additional detector. For this purpose, a conventional glass plate having a defined degree of reflection/transmission could be used as the optical component. A dichroic beam splitter, a filter, a prism, a grating, and/or a spectrally sensitive arrangement would also be conceivable as the optical component for switching out the reflected/induced light. In particular when the light induced at the planar area of the specimen support unit is fluorescent light of a fluorescent layer, said fluorescent light can be conveyed to the detector in spectrally selective fashion using a spectrally sensitive arrangement. The spectrally sensitive arrangement could comprise, for example, lenses, stops, and a prism or a grating.

Detection of the light reflected and/or induced at the planar area of the specimen support unit could be accomplished in widefield mode. The widefield mode involves planar illumination and/or detection, such as is present, for example, in a standing wave field microscope or an $I^5M$ microscope. The detector detecting the light reflected/induced at the planar area could correspondingly be embodied as a planar detector, for example in the form of a CCD chip.

The light reflected and/or induced at the planar area of the specimen support unit could be detected confocally. In that case a confocal illumination is provided; i.e. the light serving for illumination is focused onto a point of the focal plane of the microscope objective. For confocal detection, there is arranged in front of the detector a pinhole that preferably is arranged in a plane corresponding to the specimen plane of the objective. The illumination or detection pinhole of the interference microscope could be provided as the pinhole. If detection of the light reflected/induced at the planar area of the specimen support unit is accomplished using the confocal detector of the interference microscope, the pinhole arranged in front of the detector is the detection pinhole of the interference microscope. If the illumination pinhole serves as the pinhole, an optical component arranged between the light source and the illumination pinhole could switch the light reflected/induced at the planar area of the specimen support unit out of the illumination beam path and convey it to a correspondingly arranged detector.

In a preferred embodiment, provision is made for the determination of the illumination state in the specimen region of the interference microscope to be performed using light of at least one additional light source. As already mentioned, this can be a laser system, a laser, or an HBO lamp.

In a concrete embodiment, the specimen support unit is fabricated of glass. The surfaces of the specimen support unit ideally has a high degree of surface planarity, which is also exhibited by the coating or fluorescent layer that may be applied onto a surface. Concretely, the specimen support unit could be configured as a cover glass. These could be commercially available cover glasses. In a preferred embodiment, the specimen is arranged between two specimen support units, preferably between two specimen support units configured as cover glasses. Preferably the planar area of the specimen support unit that faces toward the specimen is configured in reflectable or inducible fashion.

In particular, the light reflected and/or induced at the planar area is detected. For that purpose, an intensity signal profile is detected as a function of the axial position of the planar area. For detection of the axial intensity signal profile, the specimen together with the specimen support unit is moved along the optical axis of the objective or objectives, and the light reflected and/or induced by the planar area is detected in that context using a detector. Axial positioning of the specimen together with the specimen support unit could be accomplished continuously or in steps. For precise accomplishment of the signal detection, to begin with the specimen together with the specimen support unit is positioned in such a way that the planar area of the specimen support unit is located in the focus region of the objective of the interference microscope. As a result, it is generally possible to detect a signal of the light reflected and/or induced at the planar area.

In particular, provision is made for detecting several axial intensity profiles, specifically at one and/or several points of the focal plane. In a double confocal scanning microscope or $4\pi$ microscope, the various points at which one or more intensity signal profiles are respectively to be detected are arrived at by means of a beam scan. As a result, it would also advantageously be possible to ensure that a defined phase relationship exists for several points of the focal plane, so that the specimen can be illuminated and detected with the beam scanning method, the same defined phase relationship existing for different beam deflection angles and scanning angles. The essential advantage of the beam scanning method lies in rapid specimen detection. An alternative to the beam scanning method would be a specimen scanning method, in which the specimen is moved, for example in meander fashion, through the focus of the stationary illuminating beam.

Particularly with regard to a change in the state of the interference microscope, provision is made for several detections of axial intensity signal profiles to be performed, for example in order to determine the illumination state in the specimen region of the interference microscope at different times. Provision is preferably made for detections of the intensity signal profile also to be made during a specimen detection. If light of different wavelengths is used for determination of the illumination state in the specimen region of the interference microscope, provision is made for a detection of an axial intensity signal profile to be made in each case for the light of each wavelength. Each light of a different wavelength reflected/induced at the planar area would correspondingly be associated with a detector and detected by the latter. In this case a simultaneous detection of the light of the different wavelengths would be possible. It would also be conceivable to convey the light of different wavelengths to one and the same detector each time; in this case only sequential detection of the light of the individual wavelengths is possible.

In a further method step, provision is made for the detected axial intensity signal profile to be evaluated using an algorithm. Said algorithm serves principally for determination of the phase relationship of the illuminating or detected light present in the specimen region of the interference microscope.

Concretely, provision is made for the algorithm first to determine the center point of the axial intensity signal profile. In addition, the height of the signal at the center point of the intensity signal profile is determined.

Additionally or alternatively, the algorithm could also compare the signal points of two points equidistant from the center point of the intensity signal profile. The points equidistant from the center point could, for example, be accomplished at the location at which, in $4\pi$ microscopy, the secondary maxima or the two first minima are usually arranged. Provision could furthermore be made for the algorithm to evaluate the symmetry of the intensity signal profile with respect to its center point.

Lastly, provision is made for the interference microscope to be aligned as a function of the illumination state in the specimen region. Alignment of the interference microscope is performed with the goal of implementing constructive interference in the illumination focus. A corresponding control system could be provided for that purpose. Concretely, the alignment could encompass an optical path length change of an interferometer beam path segment. This could be implemented, for example, by parallel displacement of a corresponding mirror.

The detection and alignment operations described above are repeated and are coordinated with the drift behavior of the interference microscope. For example, if the interference microscope is subject to relatively severe temperature fluctuation, frequent repetition of the detection and alignment operations will be necessary in order to control the illumination state in the illumination focus in such a way that almost exclusively constructive interference is present.

Figure 1:
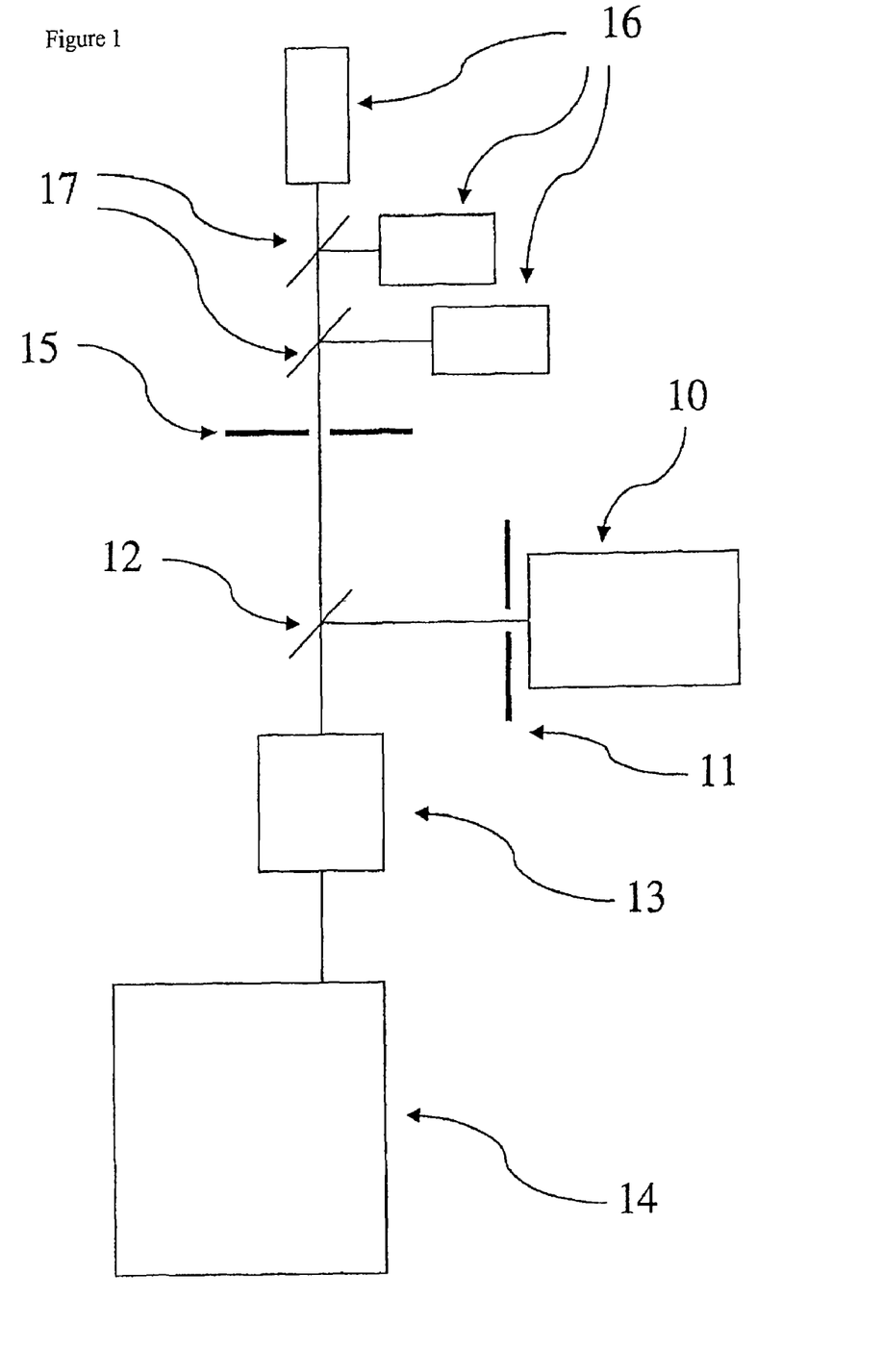
FIG. 1 schematically depicts a 4π microscope.
Figure 2:
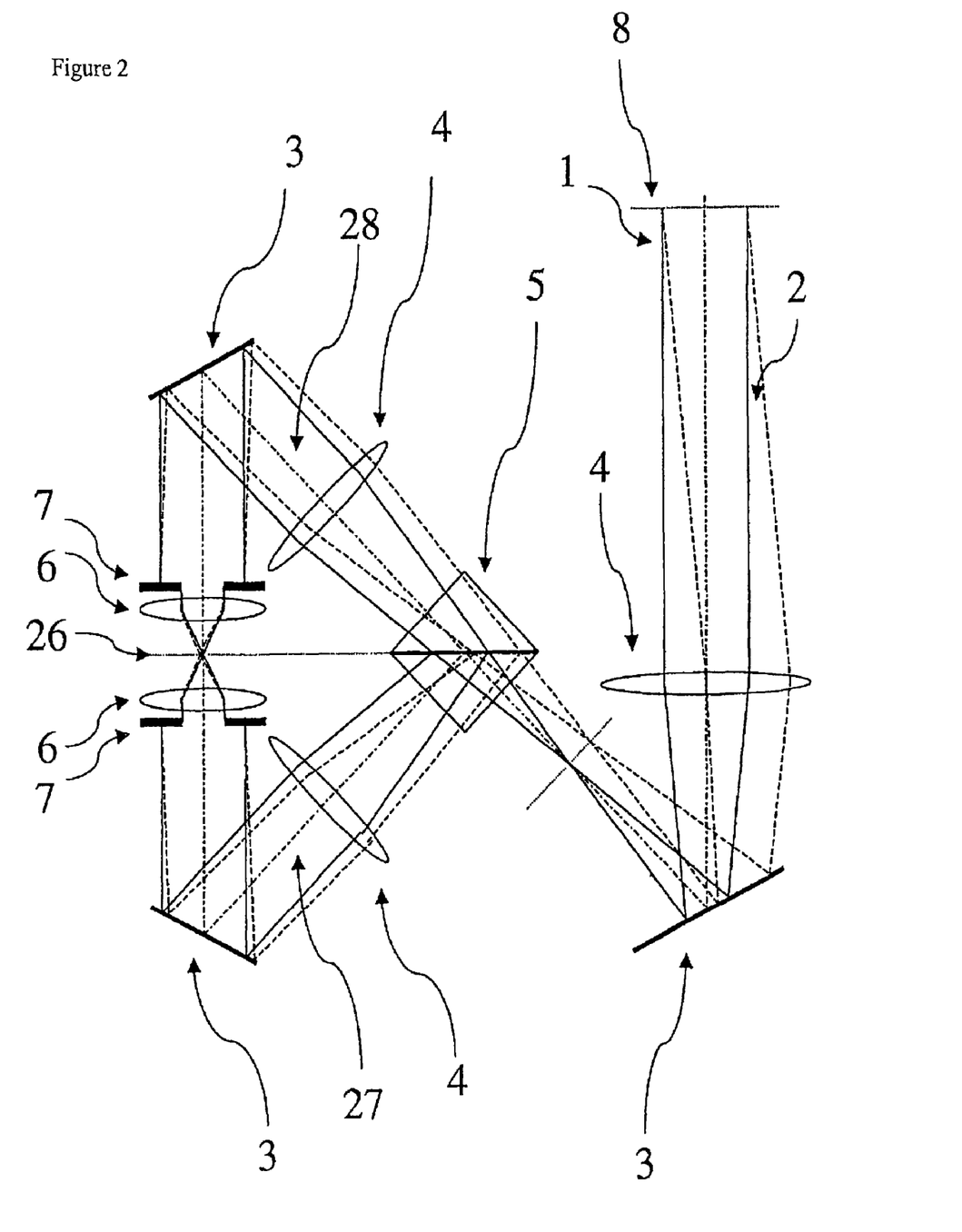
FIG. 2 schematically depicts a portion of the optical beam path of the 4π microscope of FIG. 1.

FIG. 1 shows an interference microscope that is configured as a $4\pi$ microscope. The light of light source 10 passes through excitation pinhole 11 and is deflected by dichroic beam splitter 12 toward beam deflection apparatus 13. Beam deflection apparatus 13 scans or steers the light beam in two directions that are substantially perpendicular to one another, so that ultimately, as a result of the scanning motion of beam deflection apparatus 13, the illumination focus in the specimen region scans a two-dimensional region of the focal plane, for example in meander fashion. Interference module 14, depicted only schematically in FIG. 1, is shown in FIG. 2. Here 8 indicates the interface to the microscope, which simultaneously represents a plane corresponding to the entrance pupil plane of the objective of interference module 14. Solid lines 1 indicate an undeflected or unscanned spread light beam. Light beam 2 drawn with dashed lines shows a deflected beam profile that was brought about by beam deflection apparatus 13. Light beams 1 and 2 are reflected by mirror 3 toward beam splitter cube 5. Beam splitter cube 5 divides the illuminating light into two partial beams that are each reflected by mirror 3 toward objectives 6. The two objectives 6 are arranged on either side of specimen plane 26 and directed toward one another. Entrance pupils 7 of objectives 6 are drawn in only schematically. It may be seen from the schematically indicated focus region in specimen plane 26 that as a result of the beam deflection, light beam 1 drawn with solid lines illuminates a different lateral position of specimen plane 26 than does light beam 2 drawn with dashed lines. Lenses 4 serve to displace entrance pupils 7 of objectives 6, which in interference module 14 are located farther from the plane corresponding to the entrance pupil plane of objective 8 than would be the case with a conventional microscope. The pupil displacement in FIG. 2 is brought about by means of an intermediate real image. The beam path including optical components shown in FIG. 2 is arranged in a module adaptable to a conventional microscope.

The fluorescent light reflected or emitted from the specimen, which is collected by the objectives, passes along the illuminating beam path in the opposite direction. The light passing along the two interferometer beam path segments 27, 28 is thus combined at beam splitter 5 and, after reflection at mirror 3, reflected toward interface 8 to the microscope. In the concrete case existing here, the fluorescent light emitted from the specimen also passes through beam deflection apparatus 13 in the opposite direction, and because of its wavelength properties passes through dichroic beam splitter 12. Because of the confocal arrangement, only fluorescent light from the focus region of the two objectives 6 can pass through detection pinhole 15. Dichroic beam splitters 17 arranged after detection pinhole 15 guide the fluorescent light of the various fluorochromes with which the specimen is marked to the three detectors 16, which each detect fluorescent light of a specific emission wavelength region.

Figure 3A:
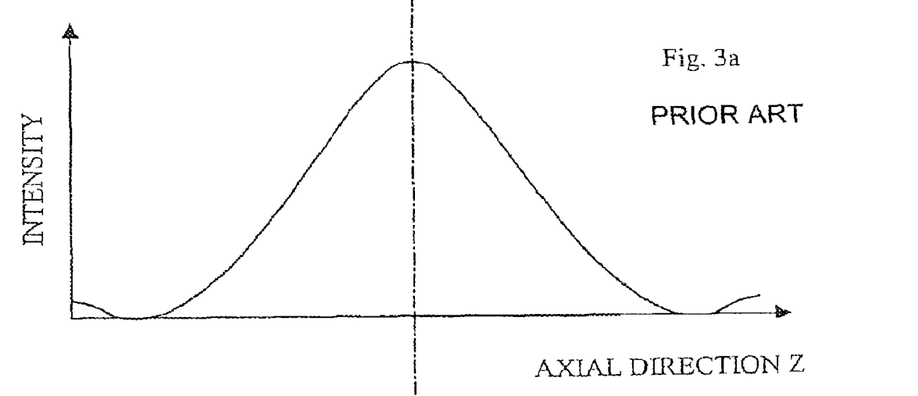
FIG. 3a shows a schematic diagram of an axial intensity signal profile in a conventional confocal scanning microscope.
Figure 3B:
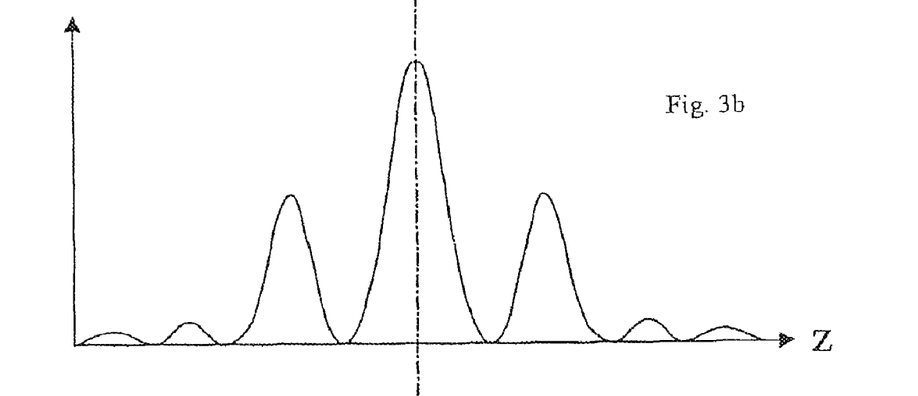
FIG. 3b shows a schematic diagram of an axial intensity signal profile of a 4π microscope in the case of constructive interference.

FIG. 3*a* shows an intensity signal profile of a conventional confocal scanning microscope as a function of the Z coordinate or the axial direction along the optical axis. An intensity signal profile of this kind can be detected, for example using a fluorescent layer present in specimen plane 26, if only interferometer beam path segment 28 is used for illumination and for detection. FIG. 3*b* shows an axial intensity signal profile as a function of the Z coordinate or axial direction of a double confocal scanning microscope or a $4\pi$ microscope. At the focus position (depicted with a dot-dash line) of the two objectives 6, the axial intensity profile of FIG. 3*b* has a main maximum. Due to the formation of an illumination interference pattern of interference module 14, two secondary maxima of lower intensity occur in addition to the main maximum, each offset approximately $\lambda/2$ axially in either direction. The axial intensity signal profile shown in FIG. 3*b* is a signal profile that results from the presence of constructive interference. In this case the phase relationship of the illuminating light passing along the two interference beam path segments 27, 28 is appropriately configured so that the two focused partial beams reinforce one another exactly in specimen plane 26.

Figure 3C:
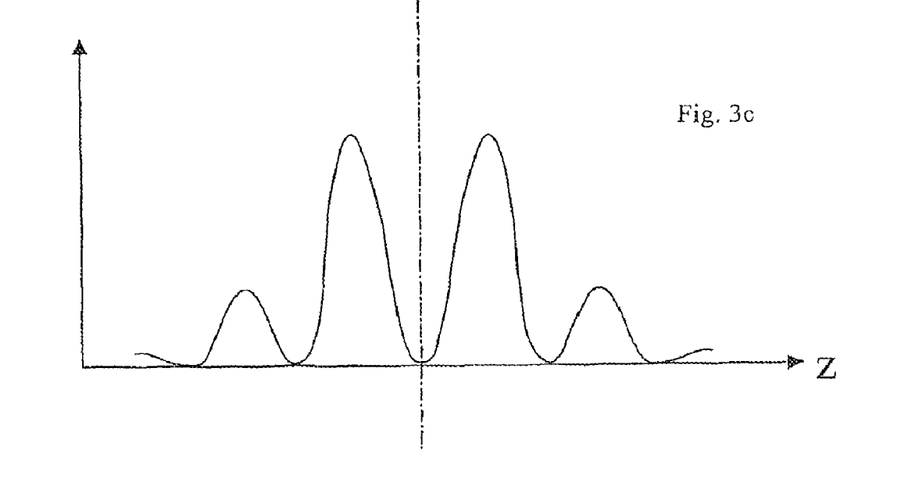
FIG. 3c shows a schematic diagram of an axial intensity signal profile of a 4π microscope in the case of destructive interference.

FIG. 3c also shows an axial intensity signal profile as a function of the Z coordinate or axial direction, in which destructive interference is present. The phase relationship of the illuminating light passing along the two interferometer beam path segments 27, 28 is thus configured such that their amplitudes exactly cancel one another out in the specimen plane, so that a minimum exists at the Z position marked with a dot-dash line.

Figure 4:
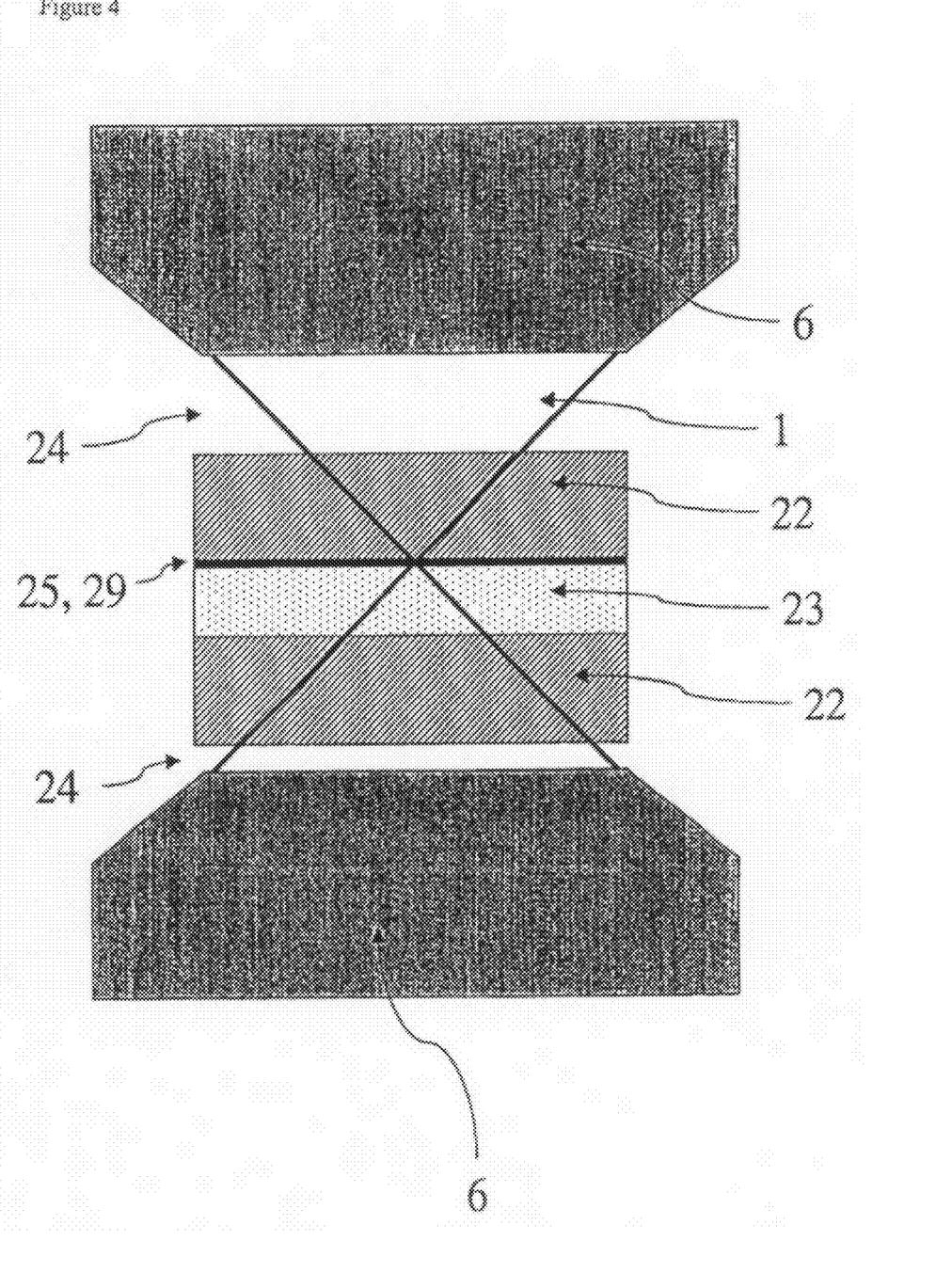
FIG. 4 schematically depicts the region between the two objectives of FIG. 2.

FIG. 4 shows the region between the two objectives 6 in magnified fashion. It is evident from FIG. 4 that the specimen to be examined is arranged in a region between two specimen support units 22, configured as cover glasses, that delimit specimen region 23. Immersion medium 24 is present in each case between cover glasses 22 and objective 6.

According to the present invention, for determination of the illumination state in specimen region 23 of the interference microscope, at least one surface 29 of a cover glass 22 is configured to be detectable by light microscopy. In this context, the light reflected/induced at surface 29 is detected by detector 16.

Surface 29 is of partially reflective configuration. For that purpose, the surface is equipped with a metallic coating 25 and has a constant reflectance. Two layers that can be excited to fluoresce (not depicted), each configured in the form of a monolayer, are applied onto metallic coating 25. The two fluorescent monolayers have differing fluorescent properties. The two fluorescent layers are each excited to fluoresce with light of light source 10. The light reflected and induced at the surface is detected with detectors 16 of the interference microscope. This detection is a confocal detection, detection pinhole 15 being arranged in front of detectors 16. Detection pinhole 15 is arranged in a plane corresponding to specimen plane 26 of objectives 6. The two specimen support units 22 are cover glasses, only one of which comprises a coating 25. Said coating is applied onto the surface of the cover glass facing toward the specimen.

In terms of method, the determination of the illumination state in specimen region 23 of the interference microscope is performed on the basis of the light reflected and induced at surface 29, by measuring an intensity signal profile as a function of the axial position of surface 29. For that purpose, the specimen together with cover glasses 22 is moved along the optical axis of objectives 6, and the light reflected and induced at surface 29 is detected by detectors 16.

The axial intensity signal profile is detected in such a way that first the specimen together with cover glasses 22 is positioned so that surface 29 of the one cover glass 22 is located in the focus region of objectives 6. Provision is made for several axial intensity signal profiles to be detected at several points in the focal plane or specimen plane 26. The various points in the focal plane are arrived at by means of a beam scan that is brought about by beam deflection apparatus 13.

Since surface 29 of cover glass 22 is coated with one partially reflective layer and two different fluorescent layers, detection of an axial intensity signal profile is performed simultaneously with each of detectors 16. For example, the illuminating light reflected at partially reflective coating 25 is conveyed to first detector 16, the fluorescent light of the one fluorescent layer to second detector 16, and the fluorescent light of the second fluorescent layer to third detector 16. The light of light source 10 serving to illuminate and excite the fluorescent layers comprises light of wavelengths 488 nm and 647 nm. First detector 16 accordingly detects the light of wavelength 488 nm reflected at reflective coating 25. The illuminating light of wavelength 488 nm excites the first fluorescent layer to fluoresce; the illuminating light of wavelength 647 nm excites the second fluorescent layer to fluoresce.

Figure 5:
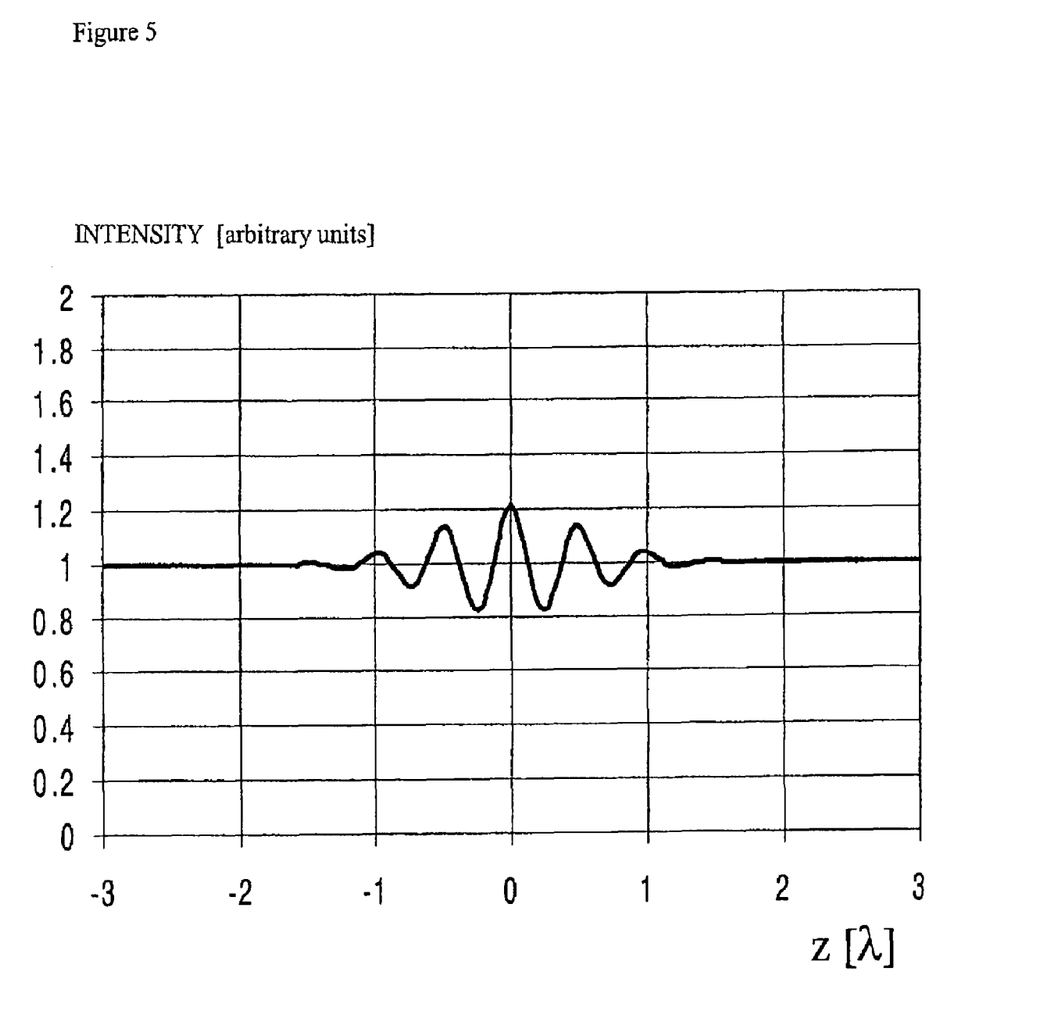
FIG. 5 shows a diagram in which the measured axial intensity signal profile is plotted as a function of the position of a coated surface along the optical axis, constructive interference being present in this case.
Figure 6:
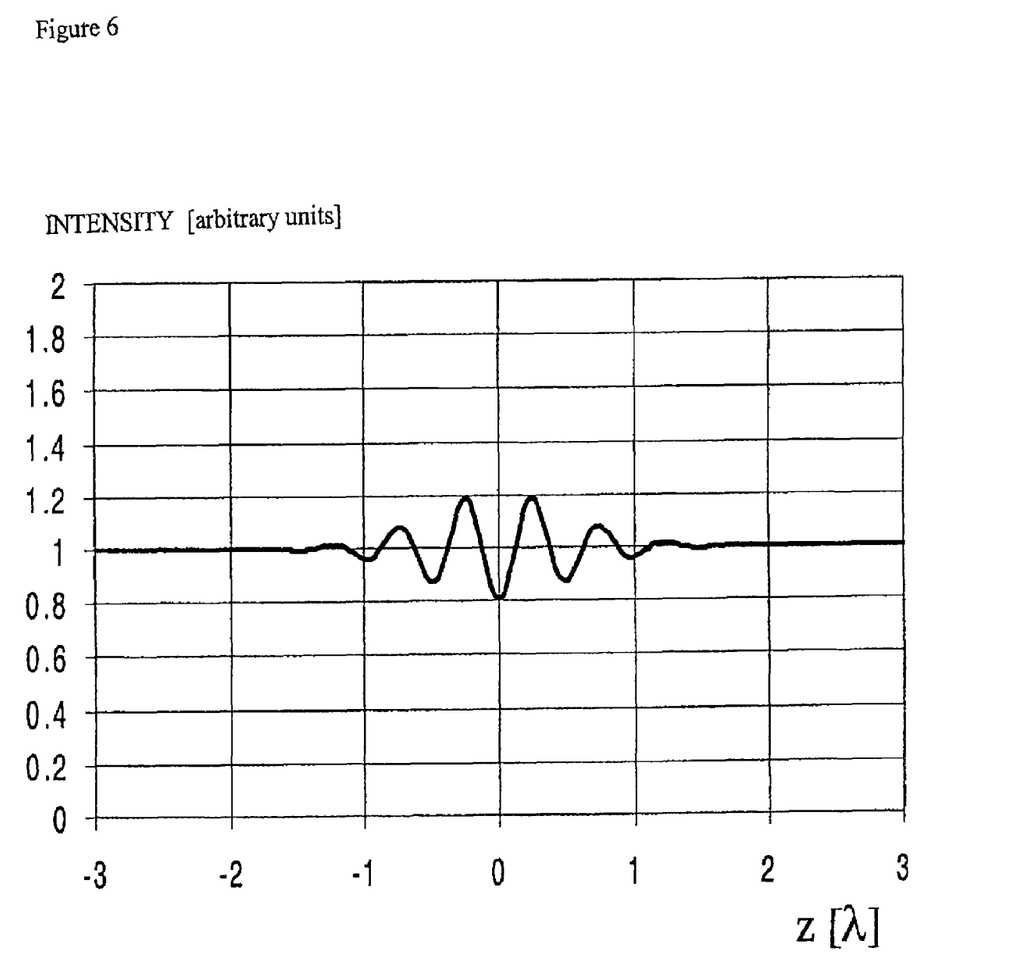
FIG. 6 shows a diagram in which the measured axial intensity signal profile is plotted as a function of the position of the coated surface along the optical axis, destructive interference being present in this case.

FIG. 5 shows, in a diagram, a measured axial intensity signal profile of first detector 16 which detects the light of wavelength 488 nm reflected at reflective coating 25. The axial intensity signal profile is depicted as a function of the Z coordinate or optical axis, and plotted in units of the wavelength used. The Z coordinate 0 corresponds to specimen plane 26. The measured intensity signal profile shown in FIG. 5 corresponds to constructive interference; i.e. in specimen plane 26, the amplitudes of the illuminating light passing along interferometer beam path segments 27, 28 add up constructively to a maximum. This could be the case precisely if the optical path lengths of interferometer beam path segments 27, 28 are of exactly equal length. This could also be the case if the optical path length differences between the two interferometer beam path segments 27, 28 differ by a multiple of $\lambda/2$. The measured axial intensity signal profile shown in FIG. 5 represents the light, reflected from coating 25 and detected by detector 16, that is made up of a reflected and a transmitted component which are added to one another at detection. The reflectance of coating 25 here is 0.05. Since the axial intensity signal profile shown in FIG. 5 concerns reflected light, said light experiences a double path length difference since the light travels twice the distance because of the reflection. If the geometrical path length difference between one interferometer beam path segment and the other is $\lambda/2$, constructive interference therefore occurs as shown in FIG. 5. If the geometric path length difference between the interferometer beam path segments 27, 28 is only $\lambda/4$, then destructive interference occurs at the detector as shown in FIG. 6. In the case of fluorescent excitation of a fluorescent layer, however, destructive interference is obtained when the optical path length difference between the two interferometer beam path segments 27, 28 is $\lambda/2$.

In advantageous fashion, the measured axial intensity signal profiles of the reflected light and of the two different fluorescent layers are measured simultaneously and together incorporated into the analysis. Since the measured signals derive from light of different wavelengths, it is in fact thereby possible, in advantageous fashion, to perform an absolute equalization of the optical path lengths of the two interferometer beam path segments 27, 28, since it is only with an absolute path length difference of 0 that the light of the different wavelengths interferes in uniformly constructive fashion, provided the wavelengths are not rational-number multiples of one another. In this case a type C $4\pi$ microscope would be implemented, namely one in which constructive interference of the illuminating light and constructive interference of the detected light are present, thereby optimizing the axial resolution.

The axial intensity signal profiles are evaluated using an algorithm. That algorithm on the one hand determines the height of the signal at the center point of the intensity signal profile, which in the case of the measured intensity signal profiles of FIGS. 5 and 6 exists at axial position 0. The algorithm furthermore compares the signal heights of two points equidistant from the center point of the intensity signal profile. The points equidistant from the center point at Z coordinate 0 are located at Z coordinates $\lambda/2$, $-\lambda/2$, i.e. exactly where the first secondary maxima of the constructive interference phenomena shown in FIG. 3b should occur.

The interference microscope is aligned as a function of the illumination state in the specimen region. Provided for this purpose is a control system that, during the procedure of measuring the axial intensity signal profiles, modifies the optical path lengths of interferometer beam path segments 27 in such a way that the measured axial intensity signal profiles exhibit a signal profile typical of constructive interference, for example as shown in FIG. 5. These detection and alignment procedures are performed repeatedly, and are coordinated with the drift behavior of the interference microscope and in particular with the drift behavior of interference module 14.

What is claimed is:

1. A method for operating an interference microscope including a first and a second objective, the method including:
    providing at least one specimen support unit associated with a specimen, the specimen support unit including a planar area configured to support a specimen in a specimen region of the microscope with the first and second objectives disposed on opposite sides of the specimen;
    positioning the specimen support unit so as to dispose the planar area in a focus region of the first objective;
    reflecting or inducing light at the planar area so as to provide interfering light in the specimen region;
    providing a beam splitter for distributing an illuminating light to opposite sides of the planar area so as to provide an interference microscope;
    providing an intensity signal profile as a function of an axial position of the planar area by detecting the reflected or induced light;
    determining a phase position of the interfering light in the specimen region based on the provided intensity signal profile; and
    aligning the interference microscope as a function of the determined phase position.

2. The method as recited in claim 1 wherein the specimen support unit includes a first and a second cover glass configured to hold the specimen therebetween, the planar area being a planar area of the first cover glass.

3. The method as recited in claim 2 wherein the first cover glass includes at least one coating, the at least one coating including the planar area.

4. The method as recited in claim 1 wherein the specimen support unit includes at least one coating, the at least one coating including the planar area.

5. The method as recited in claim 1 wherein the interference microscope includes at least one of a $4\pi$ microscope, a standing wave field microscope, an Image Interference Microscopy microscope, an Incoherent Interference Illumination Microscopy microscope, and a combination Image Interference Microscopy and Incoherent Interference Illumination Microscopy microscope.

6. The method as recited in claim 1 wherein the providing the intensity signal profile is performed by moving the specimen and specimen support unit along an optical axis of the first objective.

7. The method as recited in claim 1 further comprising providing an additional intensity signal profile at least one point of the focus region.

8. The method as recited in claim 7 wherein the focus region includes a focal plane of the first objective.

9. The method as recited in claim 1 wherein the providing an intensity signal profile is performed during a specimen detection, and further comprising providing an additional intensity signal profile during the specimen detection.

10. The method as recited in claim 1 further comprising evaluating the provided intensity signal profile using an algorithm.

11. The method as recited in claim 10 wherein the algorithm is configured to determine a height of a signal at a center point of the intensity signal profile.

12. The method as recited in claim 1 wherein the aligning is performed so as to provide constructive interference in an illumination focus of the microscope.

13. The method as recited in claim 12 wherein the aligning is performed by changing an optical path length of an interferometer beam path segment.

14. The method as recited in claim 12 further comprising repeating the providing the intensity signal profile and aligning in a manner coordinated with a drift behavior of the microscope.

15. The method as recited in claim 1 wherein the planar area is at least partially reflective.

16. The method as recited in claim 1 wherein the reflecting or inducing light is performed so as to induce fluorescence in the planar area.

17. The method as recited in claim 1 wherein the reflecting or inducing light is performed so as to induce the light by a nonlinear process.

* * * * *